United States Patent

[11] 3,614,721

| [72] | Inventor | James A. Lagoe |
| | | Woodenville, Wash. |
| [21] | Appl. No. | 842,239 |
| [22] | Filed | July 16, 1969 |
| [45] | Patented | Oct. 19, 1971 |
| [73] | Assignee | Honeywell Inc. |
| | | Minneapolis, Minn. |

[54] CONTROL APPARATUS
9 Claims, 2 Drawing Figs.

[52] U.S. Cl. .................................................. 340/5 R,
340/18 P, 340/206
[51] Int. Cl. ........................................................ H04b 11/00
[50] Field of Search ........................................... 340/3 PR,
5, 6, 16, 203–208, 18 NC, 8 LD, 18 P

[56] References Cited
UNITED STATES PATENTS
3,444,510 5/1969 Tyndale et al. ................ 340/5

Primary Examiner—Richard A. Farley
Attorneys—Charles J. Ungemach, Ronald T. Reiling and Charles L. Rubow ABSTRACT: An acoustic riser angle indicator utilizing three separate frequencies for providing information, to a remote receiver, of deviation of a riser from vertical in mutually perpendicular vertical planes. The three separate frequencies are utilized to simplify reception circuitry and to eliminate multipath problems. The time interval between the first and second pulses of different frequencies indicates the deviation from vertical in one of the planes while the time interval between the second and third pulses indicates the deviation from vertical in the quadrature plane.

CONTROL APPARATUS

THE INVENTION

The present invention is generally related to electronics and more specifically related to acoustic signal transmission. Even more specifically, the invention is related to an acoustic riser angle indicator for providing an indication of deviation from vertical in two quadrature planes.

The prior art has used various methods of obtaining information as to tilt or deviation from vertical of a riser. The reason for the concern is that the closer to vertical the riser is maintained at a given point or points thereon the less the chance there is of breakage. The prior art has used electrical cables which are somewhat unsatisfactory in view of the cost of cables and the possibility of severing the cables.

The present system on the other hand utilizes an acoustic transmitter on the riser which supplies three different frequency pulses which are time related one to another in a manner indicative of the deviation from vertical of the riser and/or transmitter unit.

It is therefore an object of the present invention to provide improved riser angle indicator.

Figure 1:
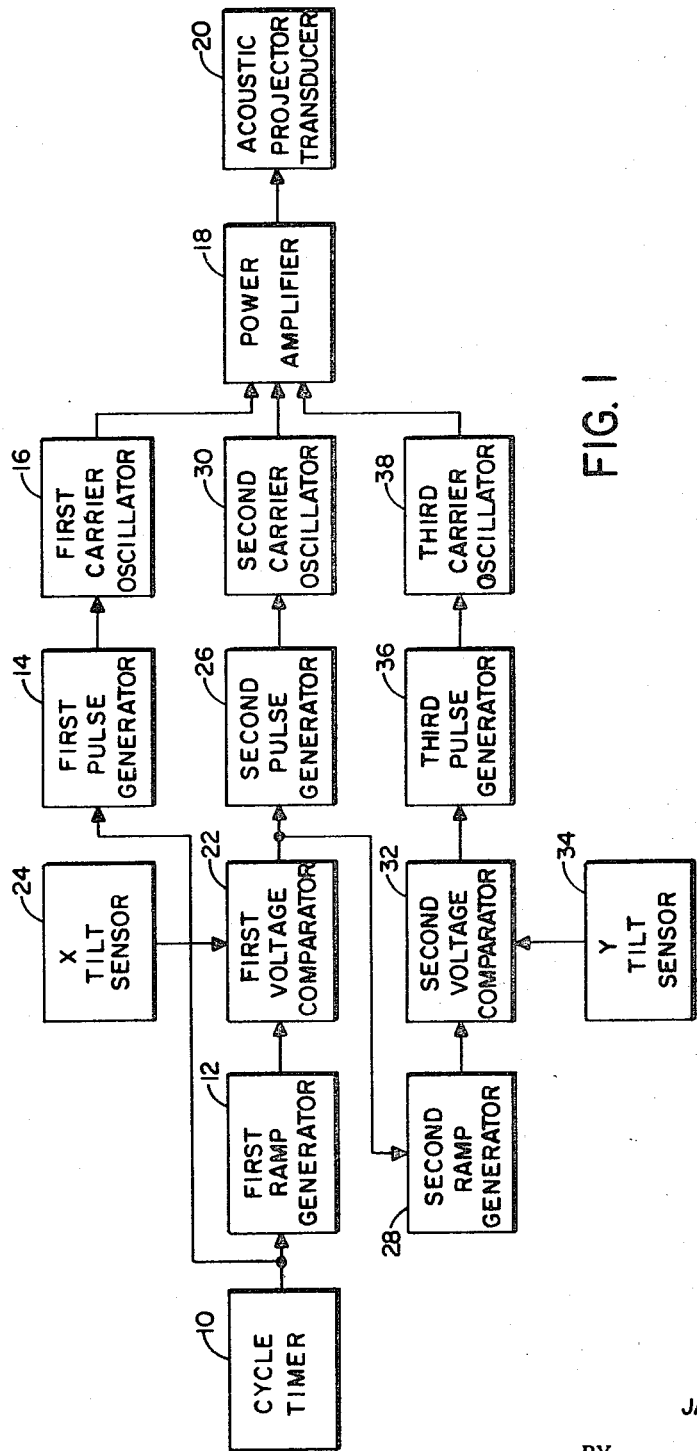
Figure 2:
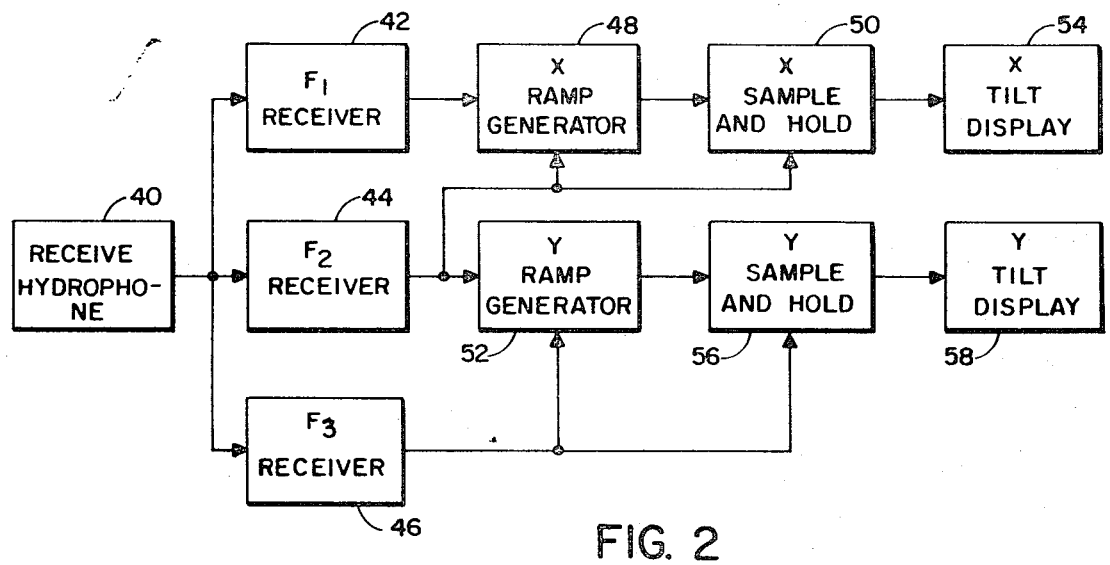

Other objects and advantages of the present invention will be apparent from a reading of this specification and appended claims in conjunction with the drawings wherein:

FIG. 1 is a block schematic diagram of a subsurface sensor and transmitter unit; and FIG. 2 is a block schematic diagram of a remote indication unit such as may be used on ship.

DESCRIPTION

In FIG. 1 a cycle timer or clock 10 supplies signals both to a first ramp generator 12 and to a first pulse generator 14. The pulse generator 14 supplies a gating signal to a first carrier oscillator 16 which in turn supplies a pulse having a given or first carrier frequency to a power amplifier 18. An output from the power amplifier 18 is supplied through an acoustic projector transducer 20 to a fluid environment. The first ramp generator 12 activates a first voltage comparator 22 which also receives an input from an X-tilt sensor 24. In the embodiment shown, a ramp signal from generator 12 is compared with a voltage signal received from X-tilt sensor 24 and an output is supplied to a second pulse generator 26 and to a second ramp generator 28 when the two received signals are substantially equal or in a predetermined ratio. The second pulse generator 26 then gates a second carrier oscillator 30 which in turn supplies a gated modulated power signal pulse through power amplifier 18 and the transducer 20 to the fluid environment. This second pulse is of a different frequency than the first pulse. The second ramp generator 28, upon activation from the first voltage comparator 22, supplies a ramp input signal to a second voltage comparator 32 which receives a second input signal from a Y-tilt sensor 34. As was the case with comparator 22, the comparator 32 provides an output to a third pulse generator 36 when the voltage signal received from the Y-tilt sensor 34 is the same as or in a predetermined ratio to the level of the ramp signal being received from generator 28. When the third pulse generator 36 receives a pulse from comparator 32, it gates a third carrier oscillator 38 to supply a modulated pulse signal through power amplifier 18 and transducer 20 to the fluid environment.

In FIG. 2 a receive hydrophone 40 receives signals from the fluid environment and supplies them simultaneously to three receivers labeled respectively 42, 44 and 46. Each of the receivers is tuned for a given different frequency corresponding to the three frequencies of the carrier oscillators 16, 30 and 38 in FIG. 1. Each of the receivers is responsive only to the given frequency and the application of other frequency signals will not produce an output. When the first frequency signal is received by receiver hydrophone 40, the receiver 42 recognizes its own frequency, amplifies, filters and detects the signal and generates a DC pulse signal at its output. Although receivers 44 and 46 do the same when their frequency signals are received, nothing occurs at the output of receivers 44 and 46 when the first frequency signal is received. The X-ramp generator 48 upon reception of the DC pulse from 42 generates a linear voltage ramp having a fixed predetermined slope. This output is supplied to an input of an X sample and hold circuit 50. When a second frequency signal is received by receive hydrophone 40, the receiver 44 detects the signal and supplies an appropriate DC pulse signal to a Y-ramp generator 52 as well as to the X-ramp generator 48 and the X sample and hold circuit 50. This causes the X sample and hold circuit 50 to hold the voltage sample being received at that time from ramp generator 48 until receipt of another pulse from the receiver 44. This signal which is held is supplied to an X-tilt display 54 to provide an indication of deviation from vertical in the X axis. The signal from receiver 44 also discharges the X-ramp generator 48. Although both circuits 48 and 50 receive the pulse at the same time, inherent delays occur in the circuit and can be designed in the circuit so that the ramp of 48 will not be destroyed before it can be sampled by circuit 50. The output signal from receiver 44 is also supplied to the Y-ramp generator 52 which thereupon supplies a linearly increasing ramp to a Y sample and hold circuit 56. This ramp is continued until receiver 46 detects its own frequency pulse at which time it supplies an output to generator 52 to discharge generator 52 while simultaneously supplying a gating signal to sample and hold circuit 56 to alter the output of 56 to a new value indicative of the output from ramp generator 52 at that time. The output from sample and hold circuit 56 is supplied to a Y-tilt display circuit 58.

Most of the block diagrams are commonly known circuits. However, for completeness additional explanation will be included. It will be recognized by those skilled in the art that the circuits mentioned infra, are only examples of many possible implementations of the circuitry and that the particular block diagram is only a preferred embodiment and is not limiting.

The cycle timer 10 can be a simple unijunction transistor oscillator using a resistor and capacitor network to set the cycle timing. The ramp generators 12, 28, 48 and 52 can be standard operational amplifiers, connected as integrators which integrate a fixed DC reference voltage. The voltage comparators 22 and 32 may each comprise a differential amplifier followed by a conventional Schmitt trigger circuit. The tilt sensing elements 24 and 34 may be pendulus potentiometers. The pulse generators 14, 26, and 36 may be standard one shot multivibrators while the carrier oscillators 16, 30 and 38 may be crystal stabilized multivibrators. The power amplifier 18 can be an integrated circuit class C power amplifier. The receivers 42, 44, and 46 may be normal super heterodyne receivers, each comprising a prefilter, a frequency converter, an IF amplifier, a pulse detector and an output pulse amplifier. Finally, the sample and hold circuits 50 and 56 may be field effect transistor gates followed by capacitor storage and operational amplifier buffers. The tilt displays 54 and 58 may be one of many types of displays either analog or digital.

OPERATION

Although the operation is probably apparent from the above description, a brief description of operation will be provided. At periodic intervals the cycle timer 10 generates a sequence start signal. This signal not only supplies a first acoustic pulse frequency which is received by the hydrophone 40 in the ship board system of FIG. 2, but also acts to start the ramp generator 12 providing a linearly increasing output voltage. When this voltage equals the voltage received from the tilt sensor 24, a secondary frequency pulse is transmitted to the hydrophone 40 of FIG. 2. The ramp generator 48 along with sample and hold circuit 50 is used to demodulate this time difference between receipt of pulses to supply an output indicative of the time difference. The time difference is of course indicative of the deviation from vertical of the unit in FIG. 1 as indicated by the X-tilt sensor 24. The second frequency pulse also acts to initiate operation of a second ramp generator 28 whose output is compared in the comparator 32 with the output from tilt sensor 34 to supply a third frequency pulse at a time difference from the second frequency pulse proportional to the Y deviation from vertical of the Y-tilt sensor. The time difference in receipt of the second and third pulses is detected by ramp generator 52 in connection with sample and hold circuit 56 and the output is displaced on Y-tilt display 58.

While a preferred embodiment of the invention has been described, the same block diagram can be utilized to provide an alternate implementation using a different type of ramp generator. In this implementation the output of the tilt sensors 24 and 34 would be used to control the slope of the ramps supplied to the respective comparators 22 and 32. An output would be obtained when the ramp reached a predetermined level. With either implementation the end result of the signals as supplied to pulse generators 26 and 36 will be the same. In one embodiment of the invention the pulse lengths were approximately 4 milliseconds to allow a long enough burst of the carrier frequency to be adequately detected by the ship board unit of FIG. 2 under all conditions.

As previously explained, the X- and Y-tilt sensors are physically mounted in two orthogonal planes thereby providing a tilt measurement in each of two directions. While the use of three different frequencies, one for each of the three pulses provides considerable immunity to reflected or multipath signals, it is not essential to the basic system but merely aids in the reduction of possible measurement errors. Although a single embodiment has been shown and an explanation given of an alternate implementation, it will be realized by those skilled in the art that yet other implementations for practicing the invention may be designed.

In view of this possibility I claim:

1. Apparatus for providing a remote indication of the orientation of an underwater unit relative to a reference direction comprising, in combination:
   means for transmitting a first acoustic pulse;
   means for transmitting a second acoustic pulse displaced in time from said first pulse by an amount indicative of the displacement of the underwater unit from the reference direction in a first plane;
   means for transmitting a third acoustic pulse displaced in time from said second pulse by an amount indicative of the displacement of the underwater unit from the reference direction in a second plane in quadrature with said first plane; and
   means for receiving said first, second and third pulses and providing outputs indicative of the displacement of said underwater unit in said first and second planes.

2. Apparatus as claimed in claim 1 wherein each of said means for transmitting said first, second and third pulses include different frequency carrier modulators.

3. Apparatus as claimed in claim 2 wherein said means for receiving includes three different frequency receiving circuits.

4. The method of obtaining a remote indication of the deflection angle from a reference direction of a transmitting unit comprising the steps of:
   transmitting a first pulse of a first frequency;
   transmitting a second pulse of a second frequency wherein the second pulse is delayed in time with respect to the first pulse by an amount proportional to the deflection of the transmitting unit from a reference direction in a first plane;
   transmitting a third pulse of a third frequency delayed in time with respect to the second pulse by an amount proportional to the deflection of the transmitting unit from said reference direction in a plane in quadrature with said first plane;
   receiving said first, second and third transmitted pulses at a remote receiver;
   detecting the time differential between said first and second pulses;
   detecting the time differential between said second and third pulses; and
   displaying an output representative of the time differentials between pulses as an indication of the deflection of the transmitting unit from the reference direction along orthogonal axes.

5. The method of claim 4 comprising the additional steps of:
   generating first and second signals indicative of the deflection of the transmitting units in each of two orthogonal planes;
   generating first and second ramp voltages; and
   comparing said first and second ramp voltages to the first and second signals respectively for determining the respective delay times of said second and third transmitted pulses.

6. The method of claim 4 comprising the additional steps of:
   generating first and second ramp voltages;
   initiating the first and second ramp voltages at the time of reception of said first and second transmitted pulses; and
   sampling the amplitude of said first and second ramp voltages at a time determined by reception of said second and third transmitted pulses respectively at a remote receiver.

7. Apparatus for transmitting signals to a remote location indicative of deflection from a reference direction of an under water transmitting unit comprising, in combination:
   timing means for periodically providing a first pulse signal;
   first modulating means connected to said timing means for receiving said first pulse signal and supplying an output pulse modulated at a first frequency;
   deflection sensing means for providing second and third output signals indicative of deflection from the reference direction in first and second orthogonal planes, each parallel to said reference direction;
   first ramp generator means connected to said timing means for receiving said first pulse signal and supplying a linearly increasing output ramp fourth signal;
   first comparator means connected to said deflection sensing means and to said first ramp generator means for providing an output fifth signal when the second signal received from said sensing means and the signal received from said first ramp generator means attain a predetermined ratio;
   second modulating means connected to receive said fifth signal and to provide an output pulse of a second frequency distinct from said first frequency;
   second ramp generator means connected to said first comparator means for providing a linearly increasing output sixth signal upon actuation from said fifth signal;
   second comparator means connected to said second ramp generator means and to said deflection sensing means for receiving said sixth and third signals respectively, said second comparator providing a pulse output seventh signal when the sixth and third signals attain a predetermined ratio;
   third modulating means connected to said second comparator for receiving said seventh signal therefrom and providing an output modulated at a third frequency distinct from said first and second frequencies; and
   means for transmitting acoustic output signals in response to signals received from each of said first, second and third modulating means.

8. Apparatus as claimed in claim 7 comprising, in addition:
   acoustic receiving means for receiving the signals transmitted by said means for transmitting acoustic output signals;
   first, second and third frequency receiving means responsive only to said frequencies supplied by said first, second and third modulating means respectively, said receiving means supplying eighth, ninth, and tenth output signals respectively;
   third ramp generating means, connected to said first and second receiving means, for supplying a linearly increasing ramp upon receipt of said eighth signal from said first receiving means and terminating said ramp upon receipt of said ninth signal from said second receiving means;
   first sampling means connected to said third ramp generating means for sampling the amplitude of said ramp upon receipt of said ninth signal from said second receiving means and providing an output eleventh signal indicative of the deflection of said deflection sensing means from said reference direction in the first of said two orthogonal planes;

fourth ramp generating means, connected to said second and third receiving means, for providing a linearly increasing ramp wherein the ramp is initiated upon receipt of said ninth signal from said second receiving means and is terminated upon receipt of said tenth signal from said third receiving means; and second sampling means providing an output twelfth signal indicative of the amplitude of the ramp output from said fourth ramp generating means upon receipt of said tenth signal from said third receiving means wherein said twelfth signal is indicative of the deflection of said deflection sensing means in the second of said two orthogonal planes.

9. Apparatus for receiving acoustic signals transmitted from a remote transmitting unit wherein the signals transmitted are of different frequencies and are spaced from one another by an amount indicative of sensed deflection in two orthogonal planes parallel to a reference direction comprising, in combination:

acoustic receiving means for receiving transmitted acoustic signals of different frequencies;

first, second and third frequency receiving means each responsive only to a particular distinct received frequency, said receiving means supplying first, second, and third output signals respectively;

first ramp generating means, connected to said first and second receiving means, for supplying a linearly increasing ramp upon receipt of said first signal from said first receiving means and terminating said ramp upon receipt of said second signal from said second receiving means;

first sampling means connected to said first ramp generating means for sampling the amplitude of said ramp upon receipt of said second signal from said second receiving means and providing an output fourth signal indicative of the deflection of the remote unit from said reference direction in a first of said two orthogonal planes;

second ramp generating means, connected to said second and third receiving means, for providing a linearly increasing ramp wherein the ramp is initiated upon receipt of said second signal from said second receiving means and is terminated upon receipt of said third signal from said third receiving means; and second sampling means providing an output fifth signal indicative of the amplitude of the ramp output from said second ramp generating means upon receipt of said third signal from said third receiving means wherein said fifth signal is indicative of the deflection of said remote unit in the second of said two orthogonal planes.